(12) United States Patent
Edwards

(10) Patent No.: US 7,136,565 B1
(45) Date of Patent: Nov. 14, 2006

(54) OPTICAL WAVEGUIDE DISK

(75) Inventor: Jathan D. Edwards, Afton, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 11/137,297

(22) Filed: May 23, 2005

(51) Int. Cl.
*G02B 6/10* (2006.01)
*B29D 11/00* (2006.01)

(52) U.S. Cl. .................. 385/132; 385/31; 264/1.24
(58) Field of Classification Search .............. None
See application file for complete search history.

(56) References Cited

U.S. PATENT DOCUMENTS

| | | | | |
|---|---|---|---|---|
| 5,109,446 | A | * | 4/1992 | Kaltschmidt ............ 385/24 |
| 5,136,678 | A | * | 8/1992 | Yoshimura ............ 385/132 |
| 5,230,990 | A | * | 7/1993 | Iwasaki et al. ............ 430/321 |
| 5,481,630 | A | * | 1/1996 | Lawandy ................ 385/16 |
| 5,953,468 | A | * | 9/1999 | Finnila et al. ............ 385/16 |
| 6,178,187 | B1 | | 1/2001 | Ueda |
| 6,533,883 | B1 | | 3/2003 | Tanaka et al. |
| 2004/0179804 | A1 | * | 9/2004 | Kuramoto et al. ........ 385/131 |
| 2004/0208418 | A1 | | 10/2004 | Handelman |
| 2005/0007894 | A1 | | 1/2005 | Hasegawa |
| 2005/0013568 | A1 | | 1/2005 | Handelman |
| 2005/0271319 | A1 | * | 12/2005 | Graham .................. 385/14 |

FOREIGN PATENT DOCUMENTS

| | | |
|---|---|---|
| EP | 0420173 A2 | 4/1991 |
| JP | 4076505 | 3/1992 |
| JP | 4248146 | 9/1992 |
| JP | 2004-029507 | 1/2004 |
| JP | 2004-184479 | 7/2004 |
| JP | 2004-184480 | 7/2004 |

OTHER PUBLICATIONS

*Introduction to Magnetic Materials*, Culity, B., ISBN 0-201-01218-9, p. 281-283.
*Principles of Modern Optical Systems*, Andonovic, I. and Uttamchandani, D., ISBN 0-89006-351-6, p. 263-265.
Bowers et al., "Filter Response of Single Mode Fiber Recirculating Delay Lines," *Electronic Letters*, vol. 18, 1982, pp. 110-111.
Jackson et al., "Microbend Optical Fiber Tapped Delay Line for Gigahertz Signal Processing," *Appl. Phys. Lett.*, vol. 41(2), 1982, pp. 139-141.

(Continued)

*Primary Examiner*—Rodney Bovernick
*Assistant Examiner*—Omar Rojas
(74) *Attorney, Agent, or Firm*—Eric D. Levinson

(57) ABSTRACT

The invention is directed to an optical element and techniques for creating the optical element. The optical element may comprise an optical delay line or a similar optical part. The optical element may have a wide variety of applications in optical data transmission, optical computing, short term transient storing, applications for optical timing, or a number of other applications. Rather than drawing a long length of optical fiber, the invention can make use of mastering and replication techniques to define a long continuous groove in a substrate. Alternatively, an etching process may be used. In either case, the groove is filled with an optical material of higher index of refraction than the substrate to define a light guide that can transmit light via total internal reflection (TIR).

8 Claims, 8 Drawing Sheets

OTHER PUBLICATIONS

Moslehi et al., "Fiber Optic Lattice Signal Processing," *Proc. IEEE*, vol. 72, No. 7, 1984, pp. 909-930.

Shabeer et al., "Fiber-Optic Bipolar Tap Implementation Using an Incoherent Optical Source," *Optics. Lett.*, vol. 12, No. 9, 1987, pp. 726-728.

Reif et al., "Optical Delay Line Memory Model with Efficient Algorithms," *Opt. Eng.*, Sep. 1997, pp. 2521-2535.

Li et al., "A Novel Fiber Delay Line Buffering Architecture for Optical Packet Switching," *Proceedings of the IEEE 2003 Global Communications Conference (GLOBCOM 2003)*, pp. 2809-2813, San Francisco, CA, Dec. 2003.

http://www.fredwalinc.com (i.e. Fredwal's Model 2001-0100), printed Sep. 27, 2005.

http://www.anancomsystems.com (i.e. Fiber-Span's RF on FIBER DWDM), printed Sep. 27, 2005.

http://www.fiberplus.com/dze.htm (i.e. Fiber Plus International's Dead Zone Eliminator Product Line), printed Dec. 13, 2005.

http://www.ozoptics.com (Optical delay lines of various length with mechanically adjustable link).

Rantala et al., "Optical Properties of Spin-On Deposited Low Temperature Titanium Oxide Thin Films," *Optics Express*, Jun. 16, 2003, vol. 11, No. 12, pp. 1406-1410.

* cited by examiner

OPTICAL WAVEGUIDE DISK

TECHNICAL FIELD

The invention relates to fiber optics and, more particularly, to optical light guides that may be used as optical delay lines or other optical computing elements.

BACKGROUND

Fiber optics are commonly used for many applications, including data transfer applications and a number of optical computing applications. For data transfer, light is typically transferred down a length of optical fiber from a source to a destination. The optical fiber comprises a light guide that operates according to principles of total internal reflection (TIR). The light may be modulated as it is introduced into the optical fiber in order to encode information in the transmitted light. For example, information may be encoded in the light by switching the light on and off, modulating the light intensity, modulating the frequency and wavelength of the light, or various combinations. In some cases, a plurality of different frequencies of light can be multiplexed on a given light guide for simultaneous transmission.

Optical computing is viewed as a potentially high-speed alternative to conventional computing techniques. The goal of an entirely optical computing machine is to replace the electrical currents and voltages common in conventional computing techniques with manipulations of light. Current implementations typically rely, at least in part, on opto-electronic elements wherein electrical signals may be converted to optical signals, transferred or manipulated, and then converted back to electrical signals. However, purely optical computing aims to virtually eliminate the opto-electronic components altogether, and therefore, eliminate the need for conversions from optical to electrical signals. Light controlled gates, light to light transistors, light amplification devices, and a number of other optical computing components are currently being developed to realize practical optical computing applications.

One type of optical component that may be very useful for optical computing, data transfer applications, or other optics applications is an optical delay line. An optical delay line is generally a relatively long length of optical fiber that introduces a time delay to an optical signal. The amount of time required for light to traverse the optical fiber (at the speed of light through the medium) is referred to as the optical delay. Delay lines have many applications, including applications as short-term transient memory elements, timing elements, or phase delayed comparator devices. In some cases, micron adjustments to the length of an optical delay line may equate to changes in the optical delay on the order of pico-seconds, which make optical delay lines attractive as accurate timing elements.

Optical fiber, such as that used for optical delay lines, is typically drawn or extruded and then wrapped around a large spool. In some cases, the optical fiber may be drawn and then embedded in a resin to form a more rigid and robust optical part. Features may also be added to optical fibers, such as diffraction gratings, to facilitate manipulation of the light that traverses the fiber.

SUMMARY

In general, the invention is directed to an optical element. The optical element may be an injection-molded part created in a manner similar to the creation of conventional optical data storage devices, such as compact disks (CDs) or digital video disks (DVDs). Unlike conventional CDs or DVDs, however, the optical element defines an optical light guide that traverses through the element. The optical light guide may comprise a spiral groove formed in an injection molded substrate, and the groove may be filled with an optical material having a higher index of refraction than the molded substrate. An additional material having an index of refraction that substantially matches that of the molded substrate may be formed over the substrate to encase the optical material in the optical part. Etched glass substrates or other substrate materials may also be used to realize the invention, but injection molded substrates yield cost and fabrication advantages.

Input and output elements may be formed on the optical element such that light can be introduced at the input element, traverse the optical material, and emerge from the output element. The input and output elements may be accessible at the inner diameter (ID) and outer diameter (OD) of a disk-shaped optical part that includes a center hole.

The grooves that define the spiraling optical element may define widths and depths of approximately 2–100 microns. While smaller grooves can define a longer light guide through a given substrate, larger grooves can reduce attenuation of light through the light guide. The widths and depths of the grooves may also be affected by the wavelength of light to be transmitted through the optical material in the grooves. Grooves having widths and depths of approximately 2–10 microns may be useful for single mode applications in which a single wavelength of light is transmitted through the light guide. Larger grooves, e.g., having widths and depths between approximately 30–150 microns, may be needed for multi-mode applications in which multiple wavelengths of light are transmitted through the light guide simultaneously.

In one embodiment, the invention provides an optical element comprising a substrate formed with a continuous groove, the substrate defining a first index of refraction; and a material in the groove to define an optical waveguide through the substrate, the material defining a second index of refraction, the second index of refraction being higher than the first index of refraction such that light can traverse the material in the groove via total internal reflection (TIR).

In another embodiment, the invention provides a method of creating an optical element comprising forming a continuous groove in a substrate, the substrate defining a first index of refraction; and filling the groove with a material to define an optical waveguide through the substrate, the material defining a second index of refraction, the second index of refraction being higher than the first index of refraction such that light can traverse the material in the groove via total internal reflection (TIR). The process of forming the continuous groove in the substrate may comprise injection molding the substrate to define the continuous groove, or possibly an etching process on glass or another material. For injection molding of the substrate, a master disk can be created to define a feature that corresponds to the continuous groove, and one or more stampers may be created from the master disk for use in an injection molding apparatus.

The invention may be capable of providing one or more advantages. For example, the invention may substantially reduce the cost of creating an optical element, which can be used for a wide variety of applications. In particular, the techniques described herein may allow the creation of optical delay lines without the need to draw long lengths of optical fiber. Instead, mastering techniques and high volume replication techniques may be used to define a substrate having a continuous groove. Optical material may then be deposited in the groove to define an optical light guide through the substrate. The described optical elements may also have improved quality relative to conventional optical delay lines. In addition, the described optical elements may have improved input and output ports formed by the mastering, replication and deposition techniques.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
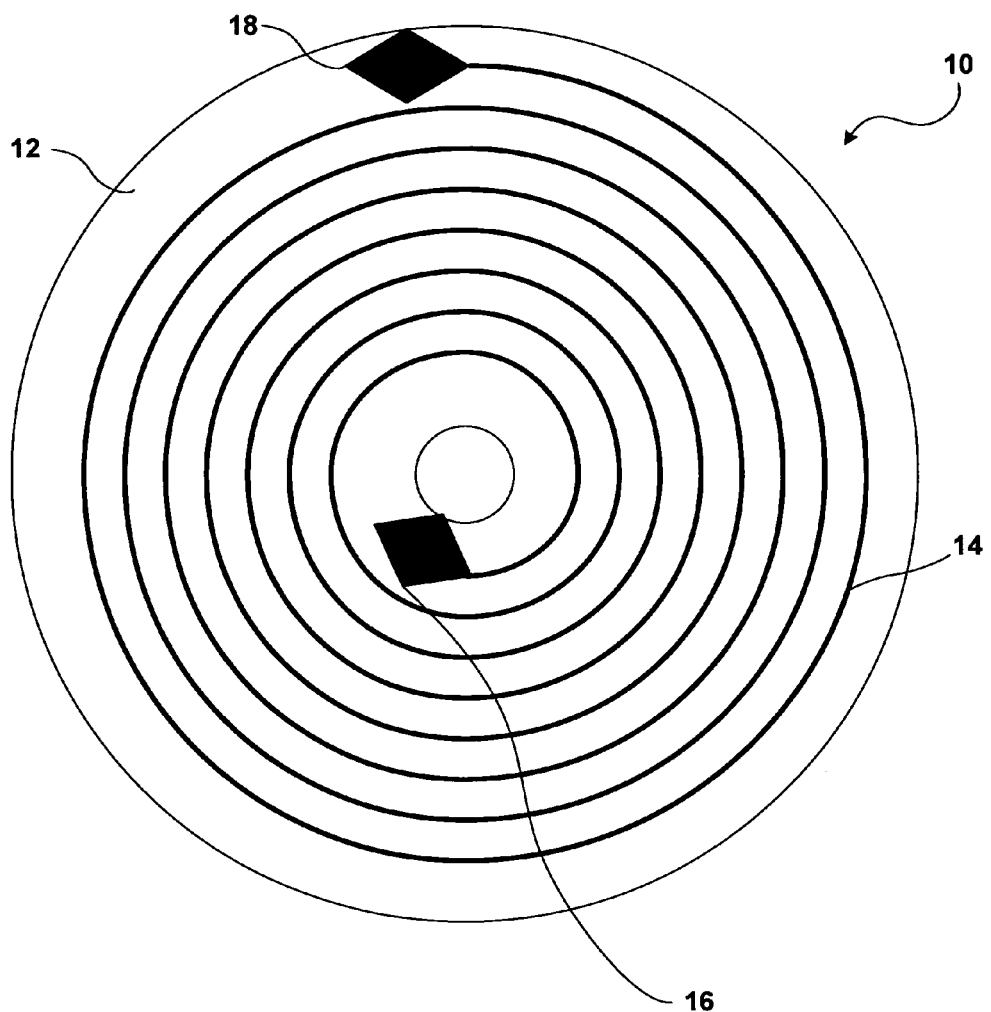
FIG. 1 is a simplified schematic plan view of an optical element according to an embodiment of the invention.

In general, the invention is directed to an optical element and techniques for creating the optical element. The optical element may comprise an optical delay line or a similar optical part. The optical element may have a wide variety of applications in optical data transmission, optical computing, short term transient storing, applications for optical timing, or a number of other applications. Rather than drawing a long length of optical fiber, the invention can make use of mastering and replication techniques to define a long continuous groove in a substrate. Alternatively, an etching process may be used.

In general, the substrate may comprise glass, injection molded thermoplastic, polycarbonate, polymethyl Methacrylate (PMMA), a transmissive plastic or possibly another material. An optical material is deposited in the groove to define an optical light guide through the substrate. Importantly, the optical material defines a higher index of refraction than the substrate, which allows light to be transmitted down the optical light guide via total internal reflection (TIR).

TIR generally refers to the phenomenon wherein light introduced into a light guide traverses the light guide by reflecting within the guide. TIR generally requires the light guide to exhibit a higher index of refraction than the surrounding environment. According to the principles of TIR, any light incident on the edge of the light guide at an angle less than the so-called "critical angle" cannot escape the light guide. In this manner, light properly introduced into one end of the light guide traverses through the light guide to the other end.

In accordance with some embodiments of the invention, mastering techniques may be used to define a master of the substrate used for the optical part (or an inverse of the substrate). The master can then be electroplated to define a stamper (or a family of stampers), which can be used in a mass-replication process. Examples of mass-replication processes that use metal stampers created from a master include injection molding processes, rolling bead processes, or other photoreplication commonly referred to as "2P" replication. In alternative embodiments, however, the substrate may be etched or machined to define the groove without the use of mastering and mass replication techniques.

Once an acceptable groove is formed in the substrate, an optical material can be deposited in the groove to define the optical light guide through the substrate. For example, the optical material may comprise a planarization coating that fills groove features of the substrate. Importantly, the optical material defines an index of refraction higher than that of the substrate, which allows TIR principles to apply to light transmission through the light guide. Input and output elements may be formed on the optical element such that light can be introduced at the input element, traverse the optical material, and emerge from the output element. The input and output elements may be accessible at the inner diameters (ID) and outer diameter (OD) of a disk-shaped optical part that includes a center hole.

In one example, the optical element may be an injection-molded part created in a manner similar to the creation of conventional optical data storage devices, such as compact disks (CDs) or digital video disks (DVDs). Unlike conventional CDs or DVDs, however, the optical element defines an optical light guide that traverses through the element. The optical light guide may comprise a spiral groove formed in an injection molded substrate, and the groove may be filled with an optical material having a higher index of refraction than the molded substrate. An additional material having an index of refraction higher than the optical material may be formed over the substrate to encase the optical material in the optical part. For example, the additional material formed over the substrate to encase the optical material may define an index of refraction that substantially matches that of the molded substrate. Alternatively, the optical material may remain exposed to ambient air, in which case the index of refraction of the optical material must also be less than that of the ambient air.

The grooves that define the spiraling optical element may define widths and depths of approximately 2–100 microns. While smaller grooves may define a longer light guide through the element, larger grooves can reduce attenuation. The widths and depths of the grooves may also be affected by the wavelength of light to be transferred through the optical material in the grooves. Grooves having widths and depths of approximately 2–10 microns may be useful for single mode applications in which a single wavelength of light is transferred. Larger grooves, e.g., having widths and depths between approximately 30–150 microns, may be needed for multi-mode applications in which multiple wavelengths of light are transferred simultaneously.

The optical element may comprise an optical waveguide formed in surface structure of disk shaped article, i.e., an optical waveguide disk. Uses or applications of the optical element may include uses as a data buffering delay-line, an optical MUX/DEMUX, and a sensing element. In general, the optical waveguide disk provides advantages in fabrication complexity and cost and size, as compared to conventional fiber delay-line technology. Again, the optical waveguide disk may be fabricated using either a glass substrate with an etching process or, at lower cost, an injection molding process similar to that used in the creation of optical recording media such as CDs and DVDs. Other substrate materials may also be used, particularly if etching or machining is used to define the grooves.

FIG. 1 is a simplified schematic plan view of an optical element 10 according to an embodiment of the invention. Optical element 10 comprises a substrate 12 formed with a continuous groove 14. The substrate defines a first index of refraction. An optical material is formed in groove 14 to define an optical waveguide through substrate 12. The material in groove 14 defines a second index of refraction, the second index of refraction being higher than the first index of refraction such that light can traverse the material in groove 14 via total internal reflection (TIR).

Optical element 10 may also comprise an input element 16 to allow light introduction into the material in groove 14 and an output element 18 to allow light extraction from the material in groove 14. In the illustrated example, optical element 10 defines a disk-shape, although other shapes could also be used. The disk-shape is useful because it facilitates mastering and mass-replication similar to the creation of conventional optical storage disks. Groove 14 may define a spiral pattern through substrate 12, although the invention is not necessarily limited in that respect. In another example, the groove might alternatively traverse back and forth in alternatively prescribed patterns through a substrate of any desired shape. In the illustrated example, input element 16 and output element 18 are defined at the inner and outer diameters of substrate 12 respectively, although these positions of the input and output elements 16 and 18 could be reversed. A center hole can be punched in substrate 12 to define the inner diameter and allow for access to input element 16 at the edge of the center hole. Output element 18 may be accessed via the outer edge of the outer diameter of optical element 10.

In some cases, a second material (not shown in FIG. 1) may be formed over substrate 12 such that the material in groove 14 is substantially encased by substrate 12 and the second material. In order to ensure that the material in groove 14 still transmits light via TIR, the second material should define an index of refraction less than the index of refraction of the material in groove 14. Preferably, the index of refraction of the second material and the index of refraction of substrate 14 substantially match. Alternatively, if the material formed in groove 14 is exposed to ambient air, the material in groove 14 should have an index of refraction less than that of the surrounding air.

Figure 2:
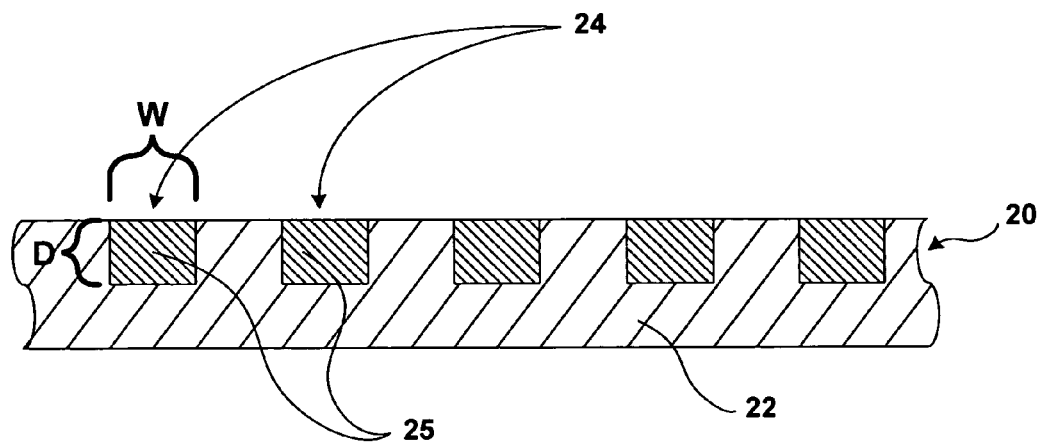
FIGS. 2 and 3 are partial cross-sectional side views of optical elements according to embodiments of the invention.

FIG. 2 is a cross-sectional side view of optical element 20, which may correspond to optical element 10 of FIG. 1. Optical element 20 comprises a substrate 22 formed with a continuous groove 24 that spirals from an outer diameter to an inner diameter of optical element. Substrate 22 defines a first index of refraction. An optical material 25 is formed in groove 24 to define an optical waveguide through substrate 22. Optical material 25 in groove 24 defines a second index of refraction, the second index of refraction being higher than the first index of refraction such that light can traverse material 25 in groove 24 via total internal reflection (TIR). The index of refraction of optical material 25 is also higher than the index of refraction of ambient air. As one example, optical material 25 may comprise a liquid phase spin coated titanium oxide film, which can be applied over substrate 22 to fill groove 24. This is one example of a class of materials known as a spin-on glass which have been demonstrated with modest annealing temperatures to provide a suitably high index of refraction for a waveguide core material. For example, approximately 60 degree Celsius annealing of a titanium oxide film can yield an index of refraction of approximately 1.72. A glass substrate, in contrast, may have an index of refraction of approximately 1.50, and an injection molded polycarbonate substrate may have an index of refraction of approximately 1.56.

The depth (D) and width (W) of groove 24 generally defines the dimensions of the light guide through substrate 22. By way of example, the width of groove 24 may be between approximately 2 and 150 microns. At dimensions smaller than 2 microns, light transmission through material 25 may be difficult at wavelengths commonly used for optical data transmission and optical computing. In general, the dimensions of groove 24 should be approximately five times the wavelength of light to be transmitted through material 25. In other words, the dimensions of groove 24 should be approximately one-half of an order of magnitude larger than the wavelength of light to be transmitted through material 25. At practical wavelengths less than a micron, the dimensions of groove 24 should typically be larger than 2 microns. Notably, as wavelengths of light become smaller than 400 nanometers, the available materials that may transmit such light via TIR become very limited.

The depth (D) of groove 24 may also be between approximately 2 and 150 microns. The depth (D) may be approximately equal to the width (W). In other words, the aspect ratio of grooves 24 may be approximately one-to-one. It is generally desirable to limit the width of grooves 24 to allow for a longer length light guide through substrate 24, but also desirable to enlarge the width of grooves 24 to improve light transmission. Widths and depths in the range of 2 and 150 microns may work well for most wavelengths (i.e., 1–2 microns) currently used in optical data transmission and optical computing.

A single mode optical waveguide generally refers to an optical fiber that is used to transmit a single frequency of light. For such applications, the width (W) and the depth (D) may be between approximately 2 and 10 microns. In contrast, a multi-mode optical waveguide refers to an optical fiber that is used to transmit two or more frequencies of light simultaneously. For such multi-mode applications, the width (W) and the depth (D) may be between approximately 30 and 150 microns.

Figure 3:
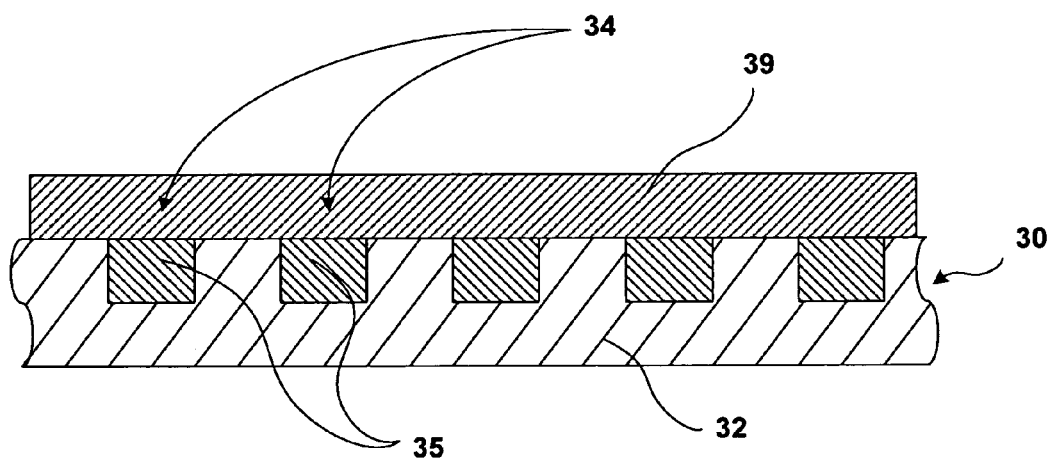

FIG. 3 is a cross-sectional side view of another optical element 30, which may correspond to optical element 10 of FIG. 1. In general, optical element 30 is very similar to optical element 20 of FIG. 2. Optical element 30 comprises a substrate 32 formed with a continuous groove 34 that spirals from an outer diameter to an inner diameter of optical element. Substrate 32 defines a first index of refraction. An optical material 35 is formed in groove 34 to define an optical light guide through substrate 32. Optical material 35 in groove 34 defines a second index of refraction, the second index of refraction being higher than the first index of refraction such that light can traverse material 35 in groove 34 via total internal reflection (TIR). The dimensions of groove 34 may be similar to those of groove 24 (FIG. 2). The differences in the first and second indexes of refraction may be defined such that the so called "critical angle" ensures that light traversing optical material via TIR will not escape.

Unlike optical element 20 of FIG. 2, optical element 30 includes an additional material 39, which forms a cover layer over substrate 32. This additional material 39 may be formed over substrate 32 such that material 35 in groove 34 is substantially encased by substrate 32 and additional material 39. In order to ensure that material 35 in groove 34 still transmits light via TIR, the additional material 39 should define an index of refraction less than the index of refraction of material 35 in groove 34. Preferably, the index of refraction of the additional material 39 and the index of refraction of substrate 32 substantially match. The additional material 39 may form a cover layer, and may comprise glass, polycarbonate, polymethyl methacrylate (PMMA), plastic or another suitable material having an index of refraction less than the index of refraction of material 35 in groove 34. Additional material 39 may be applied as a prefabricated cover layer and may be bonded to substrate 32. Alternatively, material 39 may be spin-coated or created in another manner.

An optical light guide (also referred to herein as an optical waveguide) is generally an optical conduit transmitting light of a range of wavelengths from one position to another, as guided by the physical boundaries of the optical light guide. An optical fiber is one form of a conventional optical waveguide wherein the light input into one end of the fiber is conveyed with very low losses down the fiber by total internal reflection (TIR). An optical fiber may include a core and, optionally, an outer cladding. Conventional optical fibers typically define a cylindrical shape. Such conventional optical fibers are created by drawing the material of the guide from molten glass furnaces. Plastic materials have also been used for lower cost optical fibers, usually with lower performance.

Optical fibers classified as multi-mode step-index fibers typically include a 30–100 micron core. In contrast, single mode fibers may define a core of 2–10 microns. Optical fibers may also be characterized as graded index fibers, which include a diffraction grading to separate or filter light through the guide. Guides may also be elliptical core fibers that are polarization preserving. Optical waveguide devices can also be fabricated in a planar or rectangular geometry for use as switching elements, modulators, beamsplitters, spectral filters, polarization components, etc. The techniques and optical delay-line elements described herein may be used in conjunction with devices of this type which may be incorporated in the same optical article (i.e., disk). Furthermore, the elements described may include any features that are typical to conventional fibers that are drawn and spooled.

Moreover, the physical dimensions of the grooves (e.g., grooves 14, 24 and 34 in FIGS. 1, 2 and 3) may be changed or modulated to affect light transmission through the respective optical elements (10, 20 and 30). By modulation of the physical dimensions, the optical properties and spectral properties of the optical transmission can be affected in a controlled and desired manner. In optical telecommunication, wavelength division multiplexing and demultiplexing (WDM) is commonly used to increased bandwidth over the light guide. In this case, each of the wavelengths in the transmission range is encoded individually to provide massively parallel data transmission. The multiplexing (adding in a particular wavelength channel) and demultiplexing (extracting a particular wavelength channel) are commonly accomplished by Bragg gratings, Mach Zender interferometers, and ring resonators. For example, Bragg gratings may be made with periodic modulations in the optical properties of the fiber/waveguide by patterned UV exposure, ion implantation, or photolithography with a period of one-half of the design wavelength to be reflected. Similarly, optical properties of the waveguide may be affected by application of electrical or magnetic fields to the waveguide material or by surface modifications via surface plasmon effects. The optical elements described herein may be fabricated to include any of these features common to conventional waveguides. The addition of such features may provide a number of opportunities for sensing applications.

In telecommunication, a delay line is a transmission line or equivalent device used to delay a signal. A delay line can be used to ensure that a signal input is later output after a precise (possibly programmable) delay of time. Historically, magnetostrictive delay lines have been used as memory elements. Fiber optic delay lines have been proposed for the advantages of low insertion loss (i.e., attenuation on the order of 0.5 decibels/kilometer at 1.3 micrometer wavelength independent of modulation frequency). Fiber optic delay lines also have relatively short delay times. For example, 1 kilometer of optical fiber generally equates to approximately 5 µs time delay. Moreover, fiber optic delay lines may also exhibit a relatively large time-bandwidth product (exceeding $10^5$ at 1.3 micrometer wavelength). Re-circulating delay lines, tapped delay lines, and lattice optical signal processing have been proposed for the optical signal processing applications of frequency filtering, bit-rate converters, convolution and correlation and matrix operations. Because of the lack of optical random access memory in optical computing, an optical delay line may be the only means of optical buffering in optical signal processing architectures and optical computing. The optical elements described herein may be used to produce high volume low cost delay lines, which may find application in a wide variety of fields and devices.

Commercially available fiber optic delay lines are conventionally composed of a spool of optical fiber with length on the order of up to 1–5 kilometers, depending on the capacity or delay required. Such conventional delay lines may include a transponder capable of processing signals transmitted through the fiber. Current pricing for conventional delay lines typically range from $200 (100 meter) to $950 (5000 meter), with package size of approximately five square inches (32.26 square centimeters) by one inch (2.54 centimeters), two inches (5.08 centimeters) or three inches (7.62 centimeters) thick, depending on fiber length. Again, the techniques described herein may be used to create optical elements that can operate similar to conventional delay lines, but may be fabricated at a fraction of the cost of such conventional delay lines.

In this invention, an optical element (10, 20 or 30) may comprise an optical waveguide disk. The disk can be fabricated beginning with a patterning step similar to conventional optical disk mastering, but with reduced resolution since waveguide dimensions should be on the order of microns rather than sub-micron feature dimensions for optical disks. By mastering a spiral groove of desired cross-sectional width and depth suitable for either single mode operation or multi-mode operation, conventional processes may be used to form an optical delay-line of length equal to the mastered spiral length.

Furthermore, analogous to convention optical mastering functions of wobble and power modulation, master recording waveguides with modulations in groove width or with wobbled groove with particular characteristic lengths may be used for optical spectral manipulation in like manner to the Bragg grating. Depending on the spiral pitch and the disk size, the optical waveguide disk may have varying spiral length and, thus, varying delay times. As an example, the new and emerging "Blu-Ray" optical media product has the shortest track-pitch of conventional optical products at 0.32 microns. In this case, if an optical waveguide were formed in the groove of a Blu-Ray disk having a 120 millimeter OD, the spiral length would be almost 25 miles (40.23 kilometers), yielding an optical transit time of 132 microseconds (assuming the speed of light in a vacuum). In this case, however, the waveguide dimensions would be too small for conventional telecommunication wavelengths.

Of course, the disk size may be made non-standard in relation to typical optical disks in diameter and thickness, particularly if such non-standard sizes are needed to increase the length of the delay line or otherwise advantageous for delay line or other optical computing applications. By way of example, a disk sized similar to conventional CDs or DVDs and having a spiral track pitch of 3 microns can allow a 2 micron waveguide width dimension that equates to approximately 2.63 miles (4.23 kilometers) of waveguide length and an optical transit time (assuming the speed of light in a vacuum) of about 14 microseconds. For a 50 micron spiral pitch suitable for a multi-mode waveguide, the spiral length would be 0.16 miles (0.26 kilometers), resulting in a free-air transit time of 0.85 microsecond. The data capacity for the optical delay line, of course, would also depend on the frequency limit of the optical modulators used. Multiplexing (i.e., using WDM techniques) can multiply the data capacity by N separable optical channels.

Referring again to FIG. 1, input element 16 and output element 18 may comprise tapered coupling regions, and may be formed by etching or mastering to enable coupling to the optical light guide formed by the material in groove 14. If desired, input element 16 and output element 18 may additionally include fiber mating or registration features. Optical element 10 may be coupled to a transponder (not shown) capable of processing signals transmitted through the material in groove 14.

Figure 4:
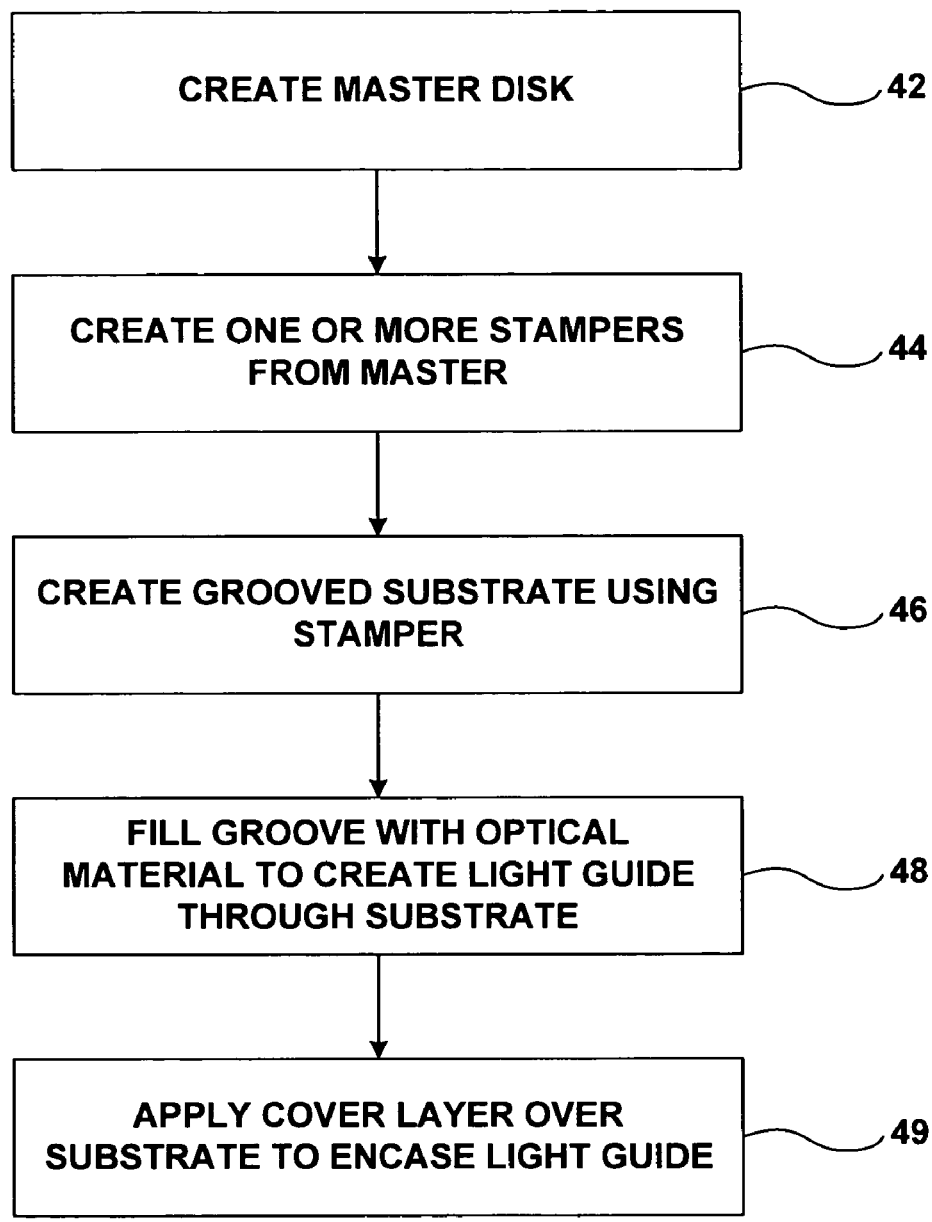
FIGS. 4 and 5 are flow diagrams illustrating different techniques for creating the optical elements described herein.

FIG. 4 is a flow diagram illustrating one technique that may be used to create an optical element as described herein. As shown, a master disk is created (42). The mastering process may comprise a photolithographic process commonly used for optical disk fabrication, or possibly another type of mastering process such as masked etching process. The master is used to create one or more stampers (44). For example, the master may be electroplated to define a stamper that exhibits an inverse of the pattern on the master. Different generations of stampers may also be created depending on whether the desired pattern to be formed in the replica substrate is that of the master, or an inverse of the pattern on the master. The creation of multiple generations of stampers can also improve productivity and output with respect to a single master disk.

Once the desired stamper is created, the stamper may be used to create a grooved substrate (46), e.g., using an injection molding process, a "2P" replication process, a rolling bead process, or the like. The groove in the substrate is then filled with optical material to create a light guide through the substrate (48). Optionally, a cover layer may be formed over the substrate to encase the light guide within the substrate and the cover layer (49).

Figure 5:
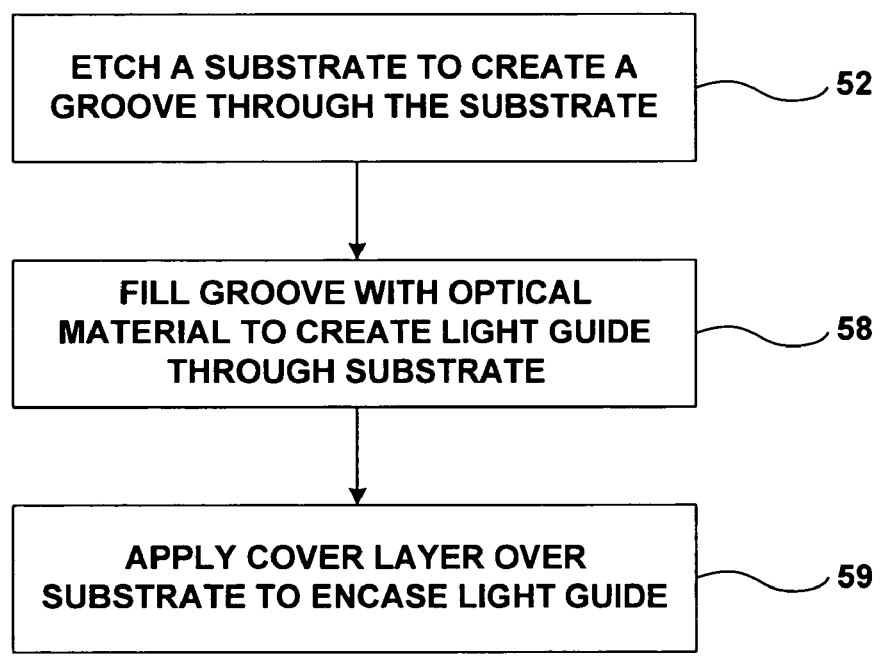

FIG. 5 is another flow diagram illustrating an alternative technique that may be used to create an optical element, as described herein. While the technique of FIG. 4 may be better suited for mass production of the optical elements, the process of FIG. 5 may allow for the creation of higher quality optical elements, e.g., using etched glass substrates. As shown in FIG. 5, the substrate is etched to create a groove through the substrate (52). The groove in the substrate is then filled with optical material to create a light guide through the substrate (58). Optionally, a cover layer may be formed or applied over the substrate to encase the light guide within the substrate and the cover layer (59). For example, the cover layer may be applied as a prefabricated sheet bonded to the substrate or may be spin-coated or formed or deposited in another manner.

Figure 6:
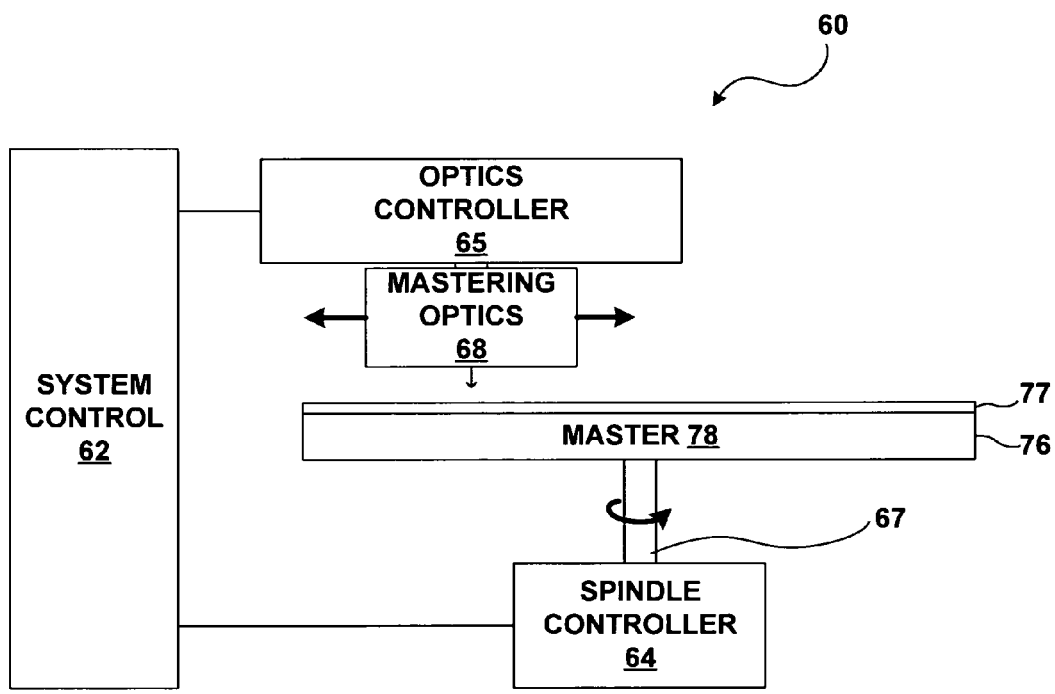
FIG. 6 is a block diagram of a mastering system that may be used in creating the optical elements described herein.

FIG. 6 is a block diagram illustrating a mastering system 60 that may be used to create a master in the process described in FIG. 4. In general, mastering system 60 includes a system control 62, such as a personal computer, workstation, or other computer system. System control 62, for example, may comprise one or more processors that execute software to provide user control over system 60. System control 62 provides commands to spindle controller 64 and optics controller 65 in response to user input. The commands sent from system control 62 to spindle controller 64 and optics controller 65 define the operation of system 60 during the mastering process.

Master 78 may comprise a disk-shaped glass substrate 76 coated with a photoresist layer 77. Other substrate materials of suitable optical surface quality may also be used. In any case, master 78 is carefully placed in system 60 on spindle 67. Mastering optics 68 include a laser source and various optical conditioners and generally provides light that exposes photoresist layer 77 according to commands by system control 62.

Spindle controller 64 causes spindle 67 to spin master disk 78, while optics controller 65 controls the positioning of mastering optics 68 relative to master 78. Optics controller 65 also controls any on-off switching of light that is emitted from mastering optics 68 in order to vary the characteristic of the mastered groove. As master 78 spins on spindle 67, optics controller 65 translates mastering optics 68 to desired positions and causes mastering optics 68 to emit light that exposes photoresist layer 77. The exposed photoresist layer 77 can then be developed with a developer solution to remove exposed or unexposed photoresist material (depending on whether a positive or negative resist is used) to define the groove in master 78.

Figure 7:
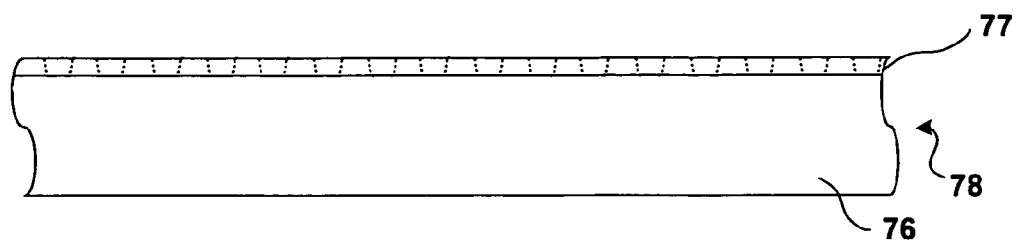
FIGS. 7–15 are a collection of partial side views illustrating the creation of an optical element according to an embodiment of the invention.
Figure 8:
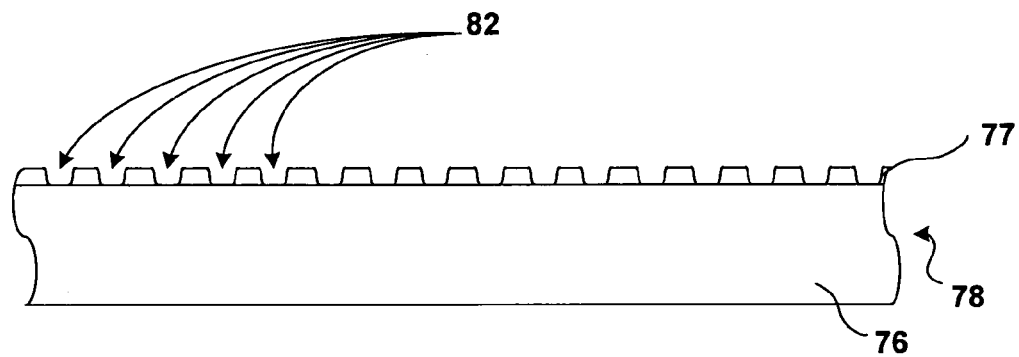

FIG. 7 is a partial side view of master 78 prior to development. The dotted lines in photoresist layer 77 correspond to the area of exposure, which follows a spiral pattern over the surface of master 78. FIG. 8 is a partial side view of master 78 following the development step. As shown, grooves 82 appear after the exposed area is developed.

Figure 9:
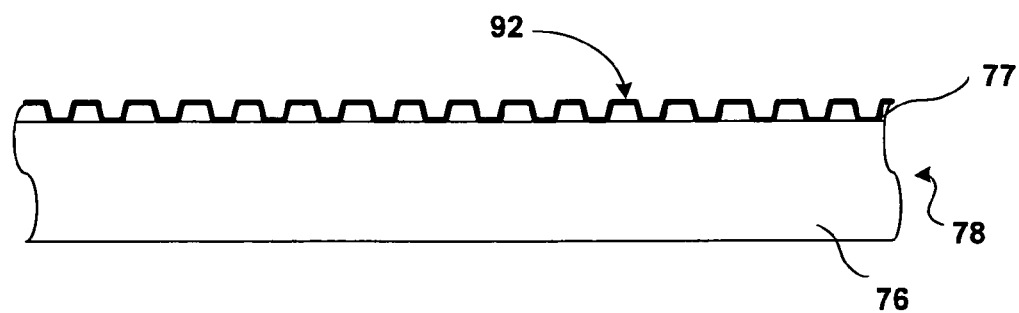
Figure 10:
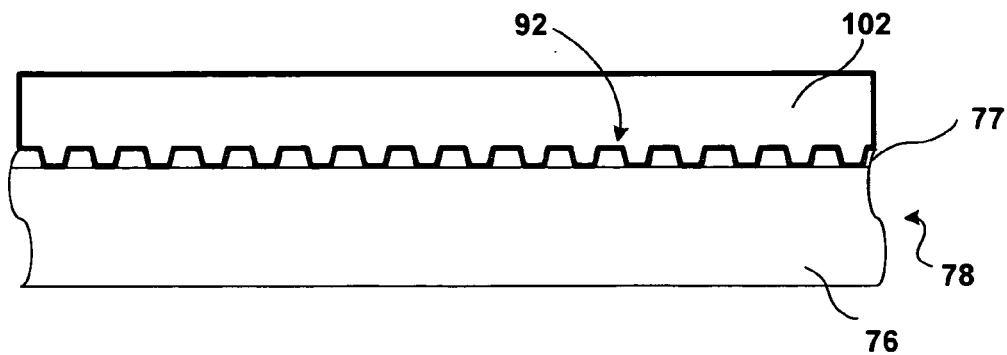
Figure 11:
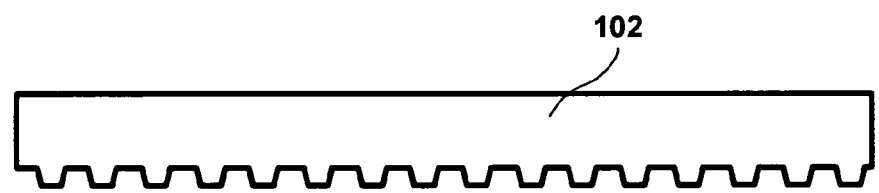

FIG. 9 is an exemplary partial side view of master 78 further including a thin layer of nickel 92 deposited over the grooved photoresist layer 77. FIG. 10 is a partial side view illustrating how the thin layer of nickel 92 can be electroplated with nickel to define a thick nickel stamper 102. FIG. 11 is a partial side view illustrating nickel stamper 102 removed from master 78. Upon removal of nickel stamper 102 from master 78, master 78 may be destroyed. Stripper solution may be used to remove excess photoresist from stamper 102.

Stamper 102 of FIG. 11 may be used in an injection molding machine, a rolling bead machine, or another machine that replicates using the "2P" photoreplication process. In injection molding, stamper 102 is placed into an injection molding cavity and molten thermoplastic is introduced to create a substrate having an inverse of the features of stamper. In a 2P rolling bead process, stamper 102 is placed into contact with a photosensitive layer to form features in the layer. A roller is passed over the stamper to stamp into the photosensitive layer. The photosensitive layer is exposed to one or more wavelengths of electromagnetic radiation to harden the photosensitive layer, and stamper 102 is peeled away.

Figure 12:
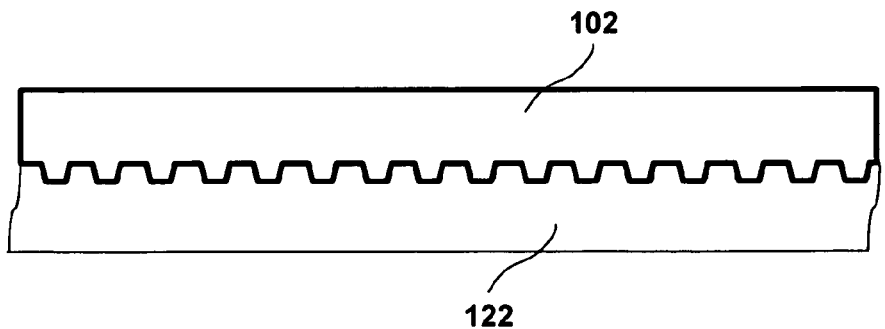
Figure 13:
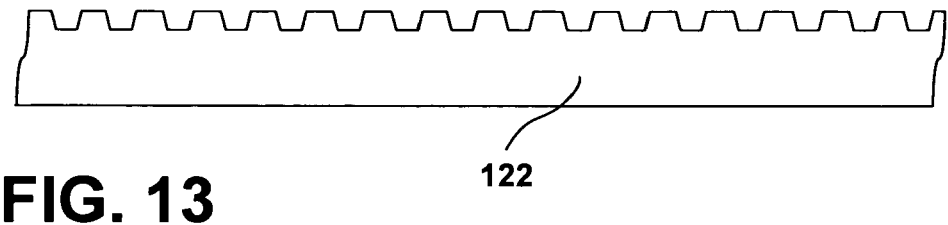

FIG. 12 is a partial side view illustrating the creation of substrate 122 using stamper 102. Again, either injection molding, a rolling bead process or another "2P" process may be used for this substrate creation step. FIG. 13 is a partial side view illustrating substrate 122 with stamper removed.

Figure 14:
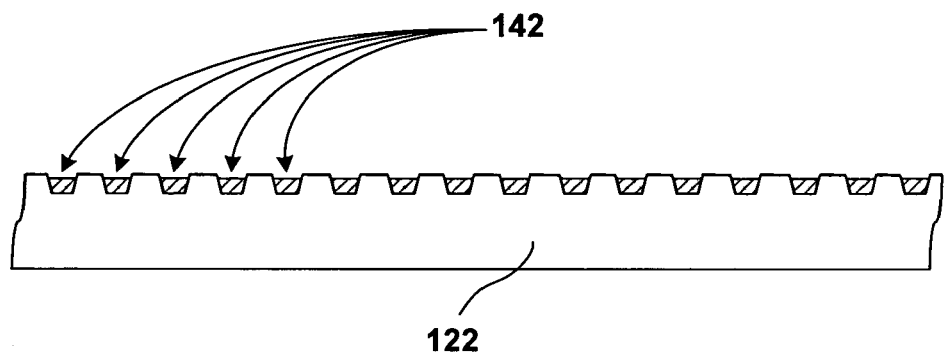

FIG. 14 is a partial side view illustrating the deposition of optical material 142 in the groove of substrate 122. As described herein, optical material 142 has a higher index of refraction than substrate 122 and functions as a light guide. Optical material 142 may comprise a planarization coating that fills groove features of substrate 122. By way of example, a liquid phase spin coated titanium oxide film may be applied over substrate 122 at a thickness such that the resulting coating fills in the groove formed in substrate 122. This is one example of a class of materials known as spin-on glass that has been demonstrated with modest annealing temperature to provide suitably high index of refraction for a waveguide core material. For example, 60 degree Celsius annealing of liquid-phase spin-coated titanium oxide film may yield a refractive index of 1.72.

Figure 15:
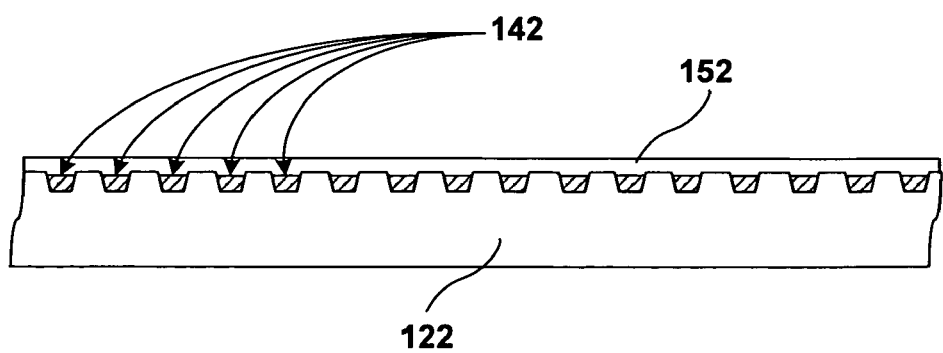

FIG. 15 is a partial side view illustrating the addition of an optional cover layer 152 over substrate 122. The ultimate result is an optical waveguide disk as shown in FIG. 14 or 15. The optical waveguide disk may have a smaller form factor than conventional delay lines and may be considerably cheaper to fabricate than conventional fiber delay-line technology. The surface access to the optical waveguide disk provides additional opportunities for sensing or modulation. Furthermore, the access to the optical waveguide disk surface allows the possibility for the optical input to be adjustable across the disk radius in order to vary the delay line length.

A number of embodiments of the invention have been described. In particular, an optical element has been described that has potential applications in a wide variety of fiber optic transmission and optical computing environments. Different techniques for creating the optical element have also been described. The described optical element may be coupled to a transponder capable of processing signals transmitted through the light guide formed in the element. Nevertheless, various modifications may be made without departing from the spirit and scope of the invention. For example, the invention may be expanded to comprise a dual sided optical waveguide disk including waveguides formed on both sides of a substrate. In addition, multi-layer waveguides are contemplated by this disclosure, i.e., disks that include multiple layers of waveguides formed on one or both sides of the optical waveguide disk light guide. In yet further embodiments, multiple optical waveguide disks with optical coupling connectivity are also contemplated by this disclosure.

As yet another added embodiment, the described optical element may be used in a data storage cartridge that includes a transmitter and a receiver each coupled to the light guide disk within the cartridge. In that case, the transmitter may send data over the light guide and then resend the same data slightly before or upon receipt by the receiver. In this way, data may be continuously stored in a transient manner in an optical wave guide storage device. These and other embodiments are within the scope of the following claims.

The invention claimed is:

1. A method of creating an optical element comprising:
   forming a continuous groove in a disk-shaped thermoplastic substrate, the substrate defining a first index of refraction, wherein forming the continuous groove comprises injection molding the substrate to define the continuous groove and wherein the continuous groove defines a spiral pattern through the substrate;
   forming input and output elements in the disk-shaped thermoplastic substrate via the injection molding; and
   filling the groove with a material to define an optical waveguide through the substrate, the material defining a second index of redaction, the second index of refraction being higher than the first index of refraction such that light can traverse the material in the groove via total internal reflection (TIR).

2. The method of claim 1, farther comprising:
   creating a master disk to define a feature that corresponds to the continuous groove;
   creating one or more stampers from the master disk; and
   injection molding the substrate using one of the stampers.

3. The method of claim 1, farther comprising:
   creating the input element to allow light introduction into the material in the groove, wherein the input element is formed in the substrate at one of an inner diameter and an outer diameter of the substrate; and
   creating the output element to allow light extraction from the material in the groove, wherein the output element is formed in the substrate at one of an inner diameter and an outer diameter of the substrate.

4. The method of claim 1, wherein a width of the groove is between approximately 2 and 150 microns.

5. The method of claim 1, wherein a depth of the groove is between approximately a and 150 microns.

6. The method of claim 5, wherein a width of the groove and the depth of the groove are between approximately 2 and 10 microns and the material in the groove defines a single mode optical waveguide.

7. The method of claim 5, wherein a width of the groove and the depth of the groove are between approximately 30 and 100 microns and the material in the groove defines a multi-mode optical waveguide.

8. The method of claim 1, further comprising forming a second material over the substrate such that the material in the groove is substantially encased by the substrate and the second material, wherein the second material defines an index of refraction less than the index of refraction of the material in the groove.

* * * * *

UNITED STATES PATENT AND TRADEMARK OFFICE
CERTIFICATE OF CORRECTION

| | |
|---|---|
| PATENT NO. | : 7,136,565 B1 |
| APPLICATION NO. | : 11/137297 |
| DATED | : November 14, 2006 |
| INVENTOR(S) | : Jathan D. Edwards |

It is certified that error appears in the above-identified patent and that said Letters Patent is hereby corrected as shown below:

Column 12
       Line 13, "redaction" should read --refraction--.
       Line 17, "farther" should read --further--.
       Line 22, "farther" should read --further--.
       Line 34, "a and 150" should read --2 and 150--.

Signed and Sealed this

Twenty-ninth Day of July, 2008

JON W. DUDAS
*Director of the United States Patent and Trademark Office*